March 28, 1961 S. BAYBICK 2,977,517
SERVOMOTOR DAMPING ARRANGEMENT
Filed June 13, 1958 2 Sheets-Sheet 1

INVENTOR.
SOLOMON BAYBICK
BY
ATTORNEY

INVENTOR.
SOLOMON BAYBICK
BY
ATTORNEY

United States Patent Office 2,977,517
Patented Mar. 28, 1961

2,977,517

SERVOMOTOR DAMPING ARRANGEMENT

Solomon Baybick, Philadelphia, Pa., assignor to Radio Corporation of America, a corporation of Delaware Filed June 13, 1958, Ser. No. 741,839

7 Claims. (Cl. 318—7)

This invention relates to servo systems, and more particularly to an improved arrangement for damping a servomotor.

In servo systems wherein it is desired to move an output (or follow-up) member at a rapid rate of speed in response to an actuating signal, it will generally not be possible to dead beat the member into position. Enough kinetic energy may be stored in the moving parts of the system to cause the output servomotor to overshoot the desired equilibrium position, thus producing hunting, also called oscillations, of the servomotor and the output member driven thereby. Various arrangements have been developed for preventing or reducing these oscillations. One such arrangement in general use is rate damping, wherein a signal that is proportional to the speed of the output servomotor is fed back to the input of the servo control circuit in opposition to the signal which actuates the motor. This speed signal is usually obtained from a rate generator, for example, a tachometer driven by the output servomotor. Rate damping feedback circuits have also been designed which do not require the use of a rate generator. The power losses in such circuits, however, are often quite high.

Accordingly, an object of the present invention is to provide a damping arrangement which effectively prevents hunting in a servo system.

Another object of the present invention is to provide a rate damping arrangement for a servomotor which obviates the need for a rate generator and its associated mechanical and electrical components.

Still another object of the present invention is to provide a rate damping arrangement which is inexpensive to construct and economical to operate.

In a simplified form of a servo system, an error signal is generated which is proportional to the lack of correspondence between the input member and the output member. This error signal is amplified and applied to the control winding of the servomotor. In response, the servomotor drives the output member, or load, in such a direction as to bring the members into correspondence and reduce the error signal. The servomotor will not respond, however, until the amplitude of the signal applied to the control winding is sufficient to overcome the friction present in the system. No feedback signal is desired in this range of operation. When the motor is operating, however, it is desirable that a signal proportional to the speed of the motor be fed back in opposition to the error signal.

The present invention provides means for accomplishing the feedback or damping signal selectively when desired. A voltage divider including the series combination of a non-linear impedance element and a fixed impedance element is connected in parallel with the control winding of the servomotor. The non-linear impedance element has preferably a negligible value of impedance to the current flowing when the voltage applied across the voltage divider is less than that necessary to produce servomotor rotation, and an impedance that increases approximately linearly with increases of voltage above this value. The characteristics of the non-linear element, which may be, for example, an incandescent lamp, are such that the voltage appearing across the element is approximately zero when the motor is not rotating, and approximately proportional to the speed of the motor when the motor is rotating. A voltage which is proportional to that appearing across the non-linear element is fed back to the motor control circuit in opposition to the error signal.

The foregoing and other objects, the advantages and novel features of this invention, as well as the invention itself, both as to its organization and mode of operation may be best understood from the following description when read in connection with the accompanying drawing, in which like reference numerals refer to like parts and which:

Figures 1, 3:
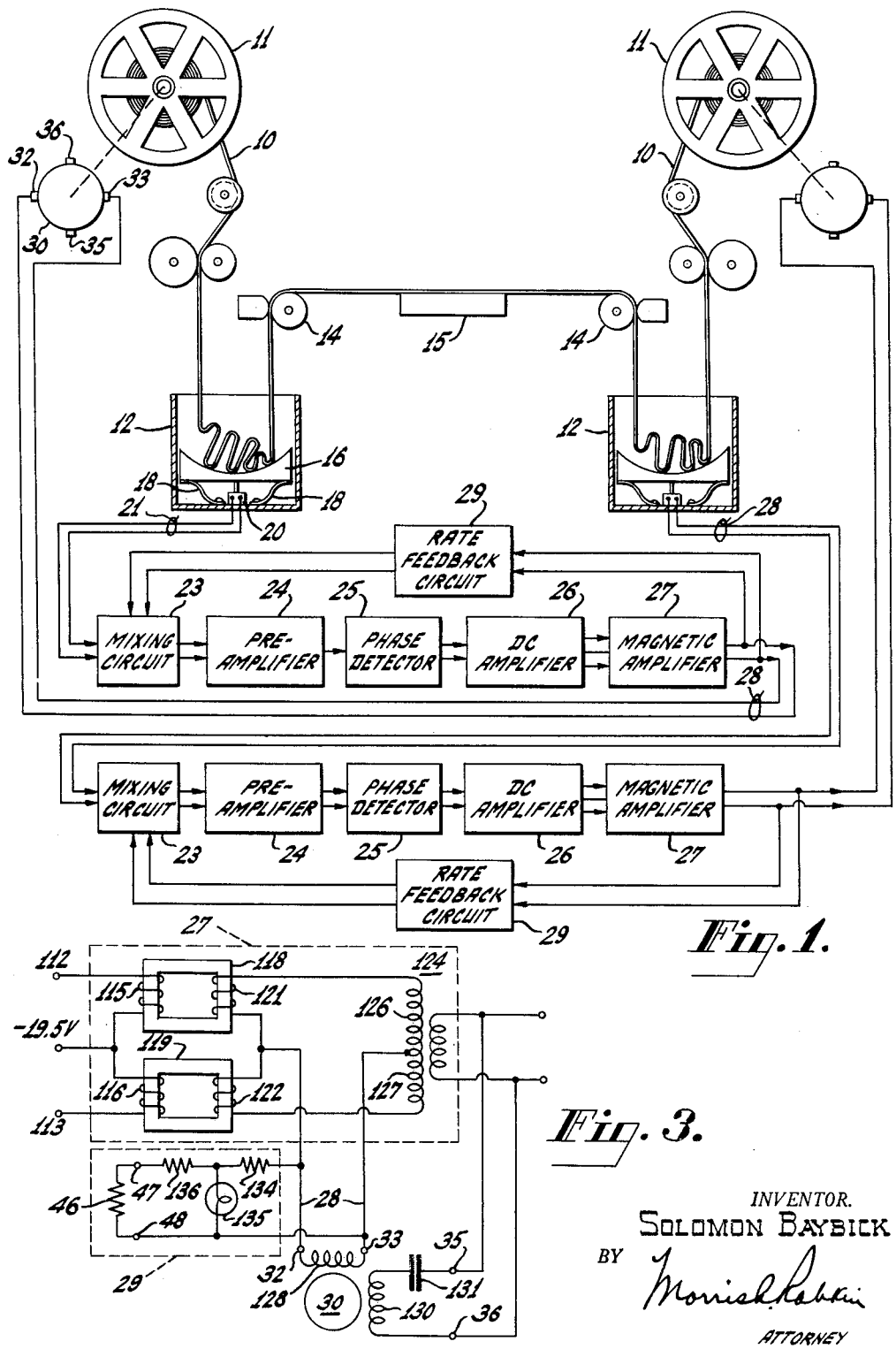
Figure 1 is a view partially in elevation and partially in clock form of a web reeling system and servo control circuits for controlling the operation of the reels.
Figure 3 is a schematice representation of the magnetic amplifier, the rate feedback circuit, and the servomotor illustrated in Figure 1.

There is illustrated in Figure 1 a web reeling system and a servo system for controlling its operation. The web reeling system is of a type suitable for use in a computer system, for example, where magnetic tape recording in employed. The web 10, or magnetic tape, is fed from one of a pair of supply and take-up reels 11 into the associated one of a pair of tape storage bins 12. From either one of the storage bins, depending upon the direction of tape movement, the tape passes over a drive capstan 14 or tape "squirter," a transducing unit 15, a second drive capstan 14, the other storage bin 12, and then to the other tape reel 11. It is desirable that the storage bins accommodate a relatively long flexible loop of tape 10 so that the tape passing over the transducing unit 15 may be accelerated rapidly in either direction without the necessity of overcoming the inertia of the reels 11. The tape 10 is supported in each bin 12 by trays 16, which trays are, in turn, supported by springs 18. The coupling element (not shown) of a differential transformer 20 is attached to the bottom of the tray 16 and moves therewith. The springs 18 are adjusted so that the differential transformer 20 has a balanced output when the desired reserve of tape 10 is present in the bin 12. Any change in the amount of tape stored in the bin, for example, by operation of the drive capstan 14, causes the tray 16 to translate from the desired equilibrium position and results in an unbalance in the output of the differential transformer 20. This unbalance, hereinafter referred to as the error signal, causes a servomotor 30 to rotate and drive the associated reel 11 in such a direction as to fill the storage bin with the desired reserve of tape.

The error signal is coupled over a pair of leads 21 to a mixing circuit 23 where it is mixed with the feedback signal. The resultant signal is fed to a preamplifier 24. The amplified signal is fed to a phase detector 25 where it is compared with a phase reference voltage to determine the relative displacement of the tray 16 from the desired position. The phase detected signal is further amplified in a direct current (D.C.) amplifier 26, the output of which is applied to a magnetic amplifier 27. The output of the magnetic amplifier 27 is applied over leads 28 to the control winding terminals 32, 33 of a split-phase servomotor 30. The motor is of a type whose speed is proportional to the applied control voltage. The motor, in turn, is driven in such a direction and at such a speed as to cause the tape reel 11 to rotate and fill its associated bin with the desired amount of tape 10. The output of the magnetic amplifier 27 is also fed to the rate feedback circuit 29 where a voltage is derived which is proportional to the speed of the servomotor 30. The output of the rate feedback circuit 29 is applied to the mixing circuit 23 in opposition to the error signal as explained hereinabove. Each of the tape reels 11 is driven by a separator servomotor 30, and each servomotor is, in turn, controlled by a separate servo control circuit. Each of the servomotors 30 and servo control circuits are identical, and a description of one is deemed sufficient.

Figure 2:
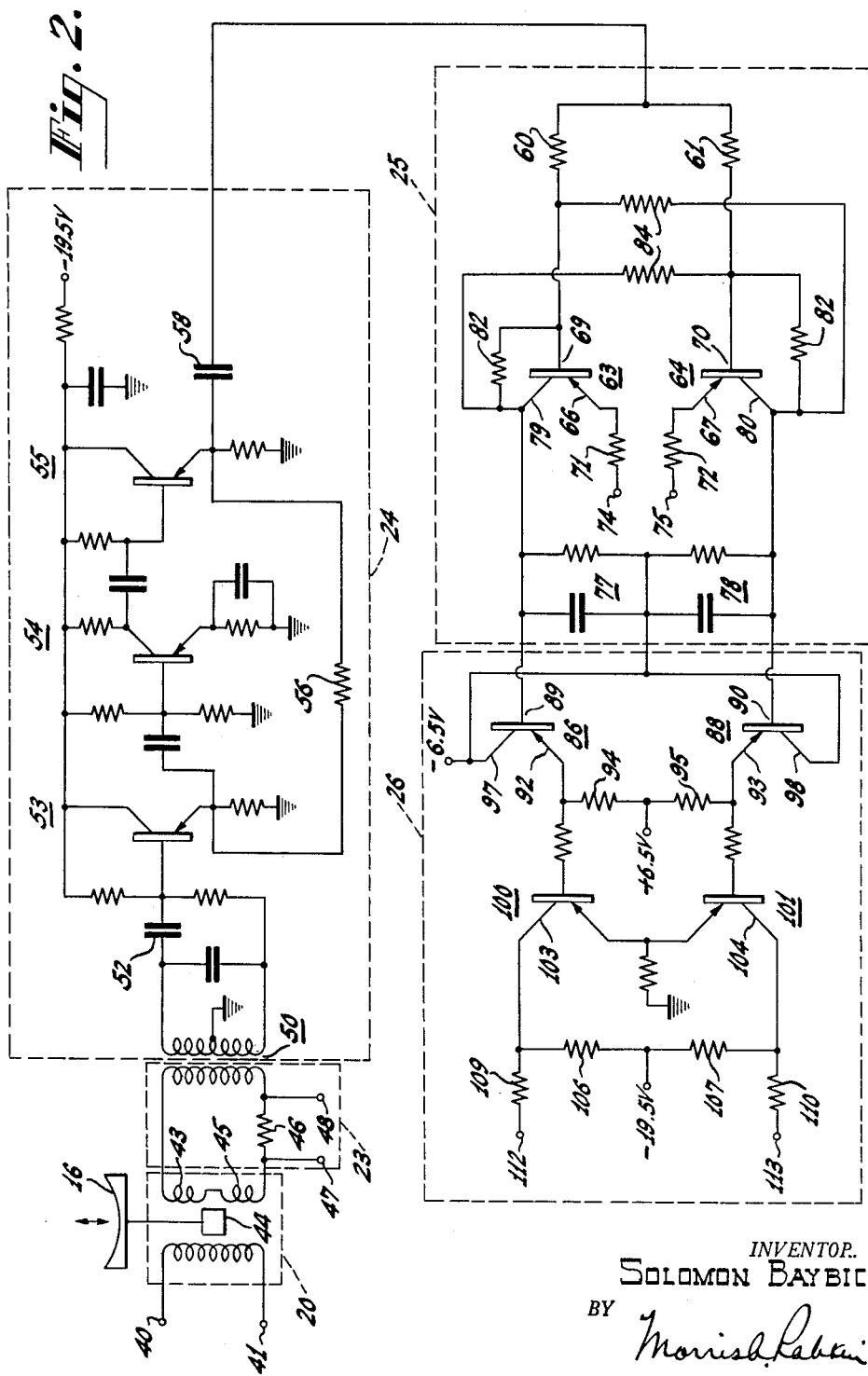
Figure 2 is a schematic representation of the mixing circuit, pre-amplifier, phase detector, and direct current amplifier illustrated in Figure 1.

Figure 2 is a schematic diagram of a portion of the servo control circuit illustrated in Figure 1. An alternating current (A.C.) voltage is impressed across the terminals 40, 41 of the primary winding of the differential transformer 20. When the desired reserve of tape 10 is present in the bin 12, the coupling element 44 is positioned so that the voltages impressed across each of the secondary windings 43, 45 of the differential transformer 20 are equal in magnitude. These secondary windings 43, 45 are wound so that the impressed voltages are out of phase one with the other. Thus, in the balanced condition, the net voltage across the secondary windings is zero. When the quantity of tape 10 in the bin 16 is altered by action of the drive capstan 14, the tray 16 and the associated coupling 44 element translate from the balanced position, and the voltages impressed across the secondary windings 43, 45 are no longer balanced. The resulting unbalance, or error signal, is applied across the primary winding of the preamplifier transformer 50. As will be explained hereinafter, the feedback signal is impressed across the terminals 47, 48 of the mixing resistor 46. In the latter case, the voltage appearing across the primary winding of the preamplifier transformer 50 is the resultant of the feedback and error signals. The resultant signal is coupled through a capacitor 52 to the first preamplifier stage 53. The output of the first preamplifier stage 53 is further amplified in the seccond and third preamplifier stages 54, 55, respectively. A portion of the output of the third preamplifier stage 55 is fed back to the first preamplifier stage 53 through a resistor 56.

The output of the third preamplifier stage 55 is coupled to the phase detector 25 through a coupling capacitor 58, and applied simultaneously through resistors 60, 61 to the base electrodes 69, 70 of a pair of transistors 63, 64, respectively. Each of the emitter electrodes 66, 67 of these transistors 63, 64 is connected through a separate resistor 71, 72 to a different one of a pair of terminals 74, 75, respectively. To these terminals 74, 75 is applied a reference voltage, which voltage is in phase with the voltage applied across the primary winding of the differential transformer 20. In the absence of an error signal, there is no signal input to the base electrodes 69, 70 of the phase detector transistors 63, 64, and each of these transistors conducts equally on alternate half-cycles of the reference voltage. Each of the collector electrodes 79, 80 is connected through a separate integrating circuit 77, 78 to a voltage source, designated −6.5 v. The voltage drop across each of these integrating circuits 77, 78 is equal in the absence of an error signal. In the presence of an error signal, one of the transistors 63, 64 conducts more heavily while the other conducts less heavily, depending upon the phase relationship between the amplified error signal and the reference voltage applied across the terminals 74, 75. This results in an unbalance in the voltage drops across the integrating circuits 77, 78. Separate resistors 82 are connected between the base and collector electrodes of each transistor and provide base bias and temperature stabilization. The base of each transistor is cross-connected to the collector of the other transistor by a resistor 84 to provide drift compensation.

The direct current (D.C.) amplifier 26 consists of two stages of parallel transmission. Voltages developed across the integrating circuits 77, 78 are applied to the base electrodes 89, 90 of the first transistors 86, 88, respectively. These transistors 86, 88 are biased just above cutoff in the quiescent condition, and each conducts equally in the absence of an error signal, that is to say, when the voltages appearing across the integrating circuits 77, 78 are equal. When an amplified error signal is coupled to phase detector 25, the resultant unbalance in voltages appearing across the integrating circuits causes one of the first transistors 86, 88 of the D.C. amplifier to conduct more heavily while the other transistor tends toward cutoff. Each of the emitter electrodes 92, 93 is connected to a source of voltage, designated +6.5 v., through a separate load resistor 94, 95. The collector electrodes 97, 98 are connected to a source of voltage, designated −6.5 v. The outputs of the first stage of direct current amplification are developed across the emitter load resistors 94, 95. These output voltages are further amplified in the second stage of D.C. amplification comprising a pair of transistors 100, 101, respectively. Each of the collector electrodes 103, 104 of the second stage is connected through a separate resistor 106, 107 to a source of voltage designated −19.5 v. The amplified output voltages of the second stage are developed across these resistors. Each of the collector electrodes 103, 104 is also connected through a separate resistor 109, 110 to a different one of a pair of terminals 112, 113, respectively.

The magnetic amplifier 27, rate feedback circuit 29, and servomotor 30 are illustrated in Figure 3. Two D.C. windings 115, 116 are serially connected between a pair of terminals 112, 113. These terminals are the similarly designated terminals illustrated in the output circuit of the D.C. amplifier of Figure 2. The connection between the windings 115, 116 is returned to a source of voltage, designated −19.5 v. With reference to Figure 2 it may be seen that the series combination of the D.C. winding 115 and resistor 109 is in parallel with the upper load resistor 106. In like manner, the combination of the other D.C. winding 116 and resistor 110 is connected in parallel with the other load resistor 107. Each D.C. winding 115, 116 is wound on a different magnetic core 118, 119, respectively. The current flowing through the D.C. winding determines the degree of saturation of the core, and thereby determines the alternating current (A.C.) impedance of the associated saturable reactor 121, 122. Each reactor 121, 122 is connected in series with a different half 126, 127 of the secondary winding of an input power transformer 124 and the motor control winding 128 of the split-phase motor 30. The control winding 128 is connected between a pair of terminals 32, 33. One of a pair of leads 28 connects terminal 33 to the center tap of the input power transformer 124. The other lead connects the other terminal 32 to a point intermediate the saturable reactors 121, 122. The voltage supplied to the primary winding of the power input transformer 124 is in phase with the reference voltage, that is to say, in phase with the voltage applied to the primary winding of the differential transformer 20. In the absence of an error signal, each of the D.C. windings 115, 116 conducts equally, and each of the saturable reactors 121, 122 has the same impedance. Consequently, the net voltage applied to the motor control winding 128 is zero. In the presence of an amplified error signal, however, one of the D.C. windings 115 or 116 conducts more heavily than normal and its associated core 118 or 119 becomes more saturated. As a result of the increased field in the magnetic core, the impedance of the associated reactor 121 or 122 is caused to decrease. The reverse is true for the other core and reactor. Due to the resultant unbalance in the impedances of the reactors, a voltage will appear across the control winding 128 of the servomotor 30. The phase of the voltage across the motor winding is determined by that D.C. winding which is conducting more heavily, while the amplitude of the voltage appearing across the motor winding is determined by the degree of saturation of the corresponding core. The amplitude of the voltage applied to the control winding of the servomotor 30 is thus seen to be a function of the amplitude of the error signal, while the phase of the applied voltage is a function of the direction of translation of the tape tray 16 from the balanced position.

The control winding 128 serves as one of the two windings of the split phase motor 30. The other winding 130 and a capacitor 131 are serially connected between a pair of terminals 35, 36. These terminals are connected to the same source of voltage as that which supplies the voltage to the power transformer 124. The capacitor 131 causes the voltages across the two windings 128, 130 to be displaced by approximately 90°. It is the purpose of the servomotor 30 to drive the tape reel 11 in such a direction as to fill the associated bin 12 with the desired amount of tape, thereby bringing the differential transformer 20 into balance. As heretofore explained, it will generally not be possible to deadbeat the motor 30 and tape reel 11 into position in the absence of a damping arrangement. This is so because the servomotor 30 and the reel 11 may store enough kinetic energy to cause these members to overshoot the desired position. This will cause an error signal to be generated of the opposite phase, and the output servomotor 30 will reverse direction in accordance therewith. As a result, the motor 30 and tape reel 11 will oscillate around the equilibrium position, each oscillation becoming smaller and smaller. In order to prevent these oscillations, or hunting, a damping arrangement is employed which feeds back a signal to the mixing circuit 23 in opposition to the error signal. A certain minimum voltage applied to the control winding 128 is required to cause rotation of the servomotor 30 due to the inertia and friction in the system. Until the amplified error signal reaches the minimum value of voltage sufficient to overcome this inertia, no feedback signal is desired. However, when the servo motor is rotating, it is desired that the feedback signal be proportional to the speed of rotation. In the embodiment illustrated, a series voltage divider comprising a non-linear impedance element 135 and a fixed impedance element 134 is connected in parallel with the control winding 128 of the servomotor. The feedback voltage is developed across the non-linear element 135, which may be, for example, an incandescent lamp. The characteristics of the non-linear element 135 and the parameters of the other elements are so chosen that a negligible voltage is developed across the non-linear element 135 in response to amplified error signals of amplitude insufficient to cause rotation of the servomotor 30. For values of amplified signal above this minimum value, however, the impedance of the non-linear element 135 increases in such a manner that the voltage developed across the element is proportional to the speed of the motor 30. The mixing resistor 46 and another resistor 136 are serially connected in parallel with the non-linear element 135. The voltage developed across the mixing resistor 46 is in phase opposition to the voltage developed across the secondary winding of the differential transformer 20. The voltage applied to the first preamplifier stage 53 is the resultant of these two voltages. The voltage applied to the control winding 128 of the servomotor 30 is thus the amplified resultant.

In a particular application of the above invention, the following values were selected for the components in the rate feedback circuit 29.

Resistor 134_____ohms__ 1500
Resistor 136_____do____ 3000
Resistor 46_____do____ 10
Lamp element 135 Type No. 47 (6.3 volt, 150 ma.)

The feedback circuit so employed effectively prevented oscillations of the servomotor 30 and the reel 11.

There has been illustrated and described a reliable and inexpensive means for deriving a rate feedback signal without the need for a rate generator. Although an incandescent lamp has been described as the non-linear element in the preferred embodiment, other non-linear devices, such as thermistors and neon bulbs, have proven entirely satisfactory in many applications, and the present invention is meant to include such acceptable substitutions.

What is claimed is:

1. In combination with a motor having a control winding, a circuit for deriving a voltage proportional to the speed of said motor comprising the series combination of an element of substantially fixed impedance and an element whose impedance varies with applied voltage, said series combination being connected in parallel with said control winding.

2. The circuit as set forth in claim 1 wherein said element whose impedance varies with applied voltage is an incandescent lamp.

3. The circuit as set forth in claim 1 wherein said element whose impedance varies with applied voltage is a thermistor.

4. In combination with a motor having a control winding and means for applying a control voltage thereto, a circuit for deriving a voltage that is proportional to the speed of said motor comprising an element of fixed impedance, a non-linear impedance element having a voltage-current characteristic that approximates the speed versus control voltage characteristic of said motor, said fixed impedance element and said non-linear impedance element being connected in series with each other and in parallel with said control winding, and output means connected across said non-linear impedance element.

5. A servomotor control system comprising a motor having a control winding, a source of signals for actuating said motor, an amplifier connected between said signal source and said control winding, means for deriving a signal proportional to the speed of said motor, said signal deriving means comprising the series combination of an element of fixed impedance and an element having a non-linear impedance characteristic, said series combination being connected in parallel with said control winding, and means for applying the output from across said non-linear element to said amplifier in opposition to said actuating signal.

6. The system as described in claim 5 wherein the non-linear impedance element is an incandescent lamp.

7. A servo system comprising a first movable member, a motor having a control winding, a second movable member arranged to be positioned by said motor, first means for deriving an error signal having an amplitude proportional to the lack of positional correspondence between said members, an amplifier connected between said first means and said control winding, second means for deriving a signal which is proportional to the speed of said motor, said second means comprising the series combination of an element of substantially fixed impedance and an element having a non-linear impedance characteristic, said series combination being connected in parallel with said control winding, and means for applying to said amplifier a signal which is proportional to that appearing across said non-linear impedance element.

References Cited in the file of this patent
UNITED STATES PATENTS 2,341,013   Black _____ Feb. 8, 1944
2,429,257   Bond _____ Oct. 21, 1947
2,692,358   Wild _____ Oct. 19, 1954

OTHER REFERENCES

Cockrell: "Industrial Electronics Control," first edition, McGraw Hill, 1944, pp. 5–6.

Chute: G. M.: "Electronics in Industry," first ed. McGraw-Hill, 1946, p. 100, Fig. 101.